INVENTOR:
FRIEDRICH JULIUS MAAS
By Richards & Geier
ATTORNEYS

April 10, 1956 F. J. MAAS 2,741,331

ELECTROSTATIC GAS PRECIPITATION

Filed March 29, 1952 2 Sheets-Sheet 2

INVENTOR:
FRIEDRICH JULIUS MAAS
By Richards & Geier
ATTORNEYS

United States Patent Office 2,741,331
Patented Apr. 10, 1956

2,741,331

ELECTROSTATIC GAS PRECIPITATION

Friedrich Julius Maas, Zurich, Switzerland, assignor to Société Financière d'Expansion Commerciale et Industrielle S. A. "SFINDEX," Sarnen, Switzerland, a company of Switzerland Application March 29, 1952, Serial No. 279,399

Claims priority, application Switzerland March 19, 1952

4 Claims. (Cl. 183—114)

The invention relates to a process and an apparatus for the electrostatic separation of solid and liquid particles of foreign matter from a gaseous stream after prior electrical charging of the said particles.

The process is characterized by the fact that an electrically insulating additional medium in vaporous form is added to the gaseous stream to be freed from particles of foreign matter and that the mixture is then subjected to conditions which cause condensation of the additional medium, the particles of foreign matter entrained by the gaseous stream acting as condensation nuclei and the gaseous stream together with the particles of foreign matter so enlarged is conducted through a radioactively irradiated, enclosed space in which the ionized molecules formed in the gas are electrically charged, so that in a succeeding electrode system an electrical field prevailing in said system and predominantly directed transversally to the direction of flow of the gas exerts a deflecting force on the electrically charged condensation particles together with the particles of foreign matter, under the influence of which force the said particles move in the direction towards the electrodes, are precipitated there, and form a liquid film containing the particles of foreign matter, which film in turn, without detriment to the electrode system, acts as a flushing medium and flows continuously, together with the separated particles of foreign matter, out of the electrode system.

The apparatus for the performance of the process is provided with at least one space or chamber for the ionization of the gas molecules and with at least one further, separator space or chamber containing an electrode system, in which said separator space or chamber, by means of an electrical field directed transversally to the direction of flow of the gas, a deflecting force is exerted upon the particles of foreign matter, under the action of which said deflecting force the said particles of foreign matter move in the direction of the electrodes, and is characterized by the fact that radioactive substances predominantly emitting alpha rays are provided in the ionizing chamber and means for the introduction of an electrically insulating additional medium in vaporous form and means for causing condensation of the said additional medium are provided at at least one point before the ionizing chamber, the whole in such a manner that the particles of foreign matter entrained by the gaseous current serve as condensation nuclei and the particles of foreign matter are therefore enlarged by the condensation of the additional medium before being electrically charged in the ionizing chamber, the particles of foreign matter forming, when precipitated upon the electrodes of the separator chamber, a liquid film which, without detriment ot the electrode system, acts as a flushing medium and by suitable means can be continuously discharged, together with the separated particles of foreign matter, from the electrode system.

Devices for the electrostatic separation of particles of foreign matter from a gaseous current after prior electrical charging of the said particles are known in great number, especially constructions in which the electrical charging of the particles of foreign matter is effected by ionization of the gaseous stream by means of an electrical glow-discharge. There have also become known of late devices in which the gaseous stream is ionized by radioactive irradiation thereof and which encompass the electrical charging of the particles of foreign matter entrained by the gaseous stream by means of the gaseous ions so formed. While both types of electrostatic separator are far superior to non-electric filtering apparatus in respect of their efficiency in separating off particles of foreign matter of very small diameter (below about $10^{-4}$ cm.), their separatory action in respect of still smaller particles of foreign matter likewise decreases, since the magnitude of the electrical charge producible per particle of foreign matter declines as the surface area of such particle becomes smaller.

In non-electric filtering apparatus, various methods by which the size of the particles of foreign matter is increased before the said particles enter the filtering apparatus are employed to enhance the efficiency of the apparatus in respect of small particles of foreign matter. These methods include so-called condensation processes in which the enlargement of the particles is effected by the admixture of a vaporous additional medium to the gaseous stream and by subsequent condensation, the particles of foreign matter acting as nuclei of condensation.

So far it has not been possible to employ this condensation process in electric separators because ionization by glow-discharges does not permit of such employment. Only one proposed process is known in which a similar method for humidifying and rendering conductive particles of foreign matter is indicated for the purpose of separating the said particles by means of magnetic, but not by means of electrostatic, fields.

As opposed to the foregoing, the apparatus in accordance with the present invention enables a condensation process to be employed for enlarging the particles, together with radioactive ionization of the gaseous stream and electrostatic separation off of the enlarged and electrically charged particles of foreign matter. The apparaus is described below with reference to Figures 1 to 3, in typical embodiments, of which figures.

Figure 1:
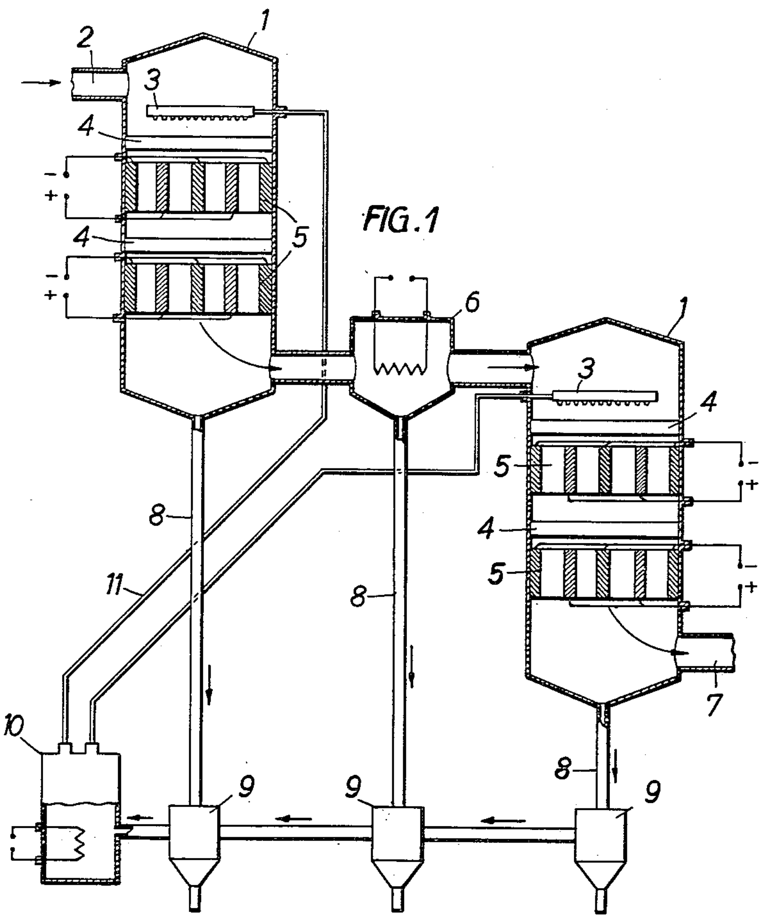
Fig. 1 shows an apparatus consisting of two filter tanks and operating with an intermediate cooler.

Figure 1 shows diagrammatically a typical embodiment of the apparatus in which two similar devices 1 are swept through one after the other by the gas to be cleansed of entrained solid and liquid particles of foreign matter, the said devices here taking, by way of example, the form of two vertically disposed filter tanks. The gas is supplied to the first filter tank 1 through the pipe-end 2 at the top and is, immediately after its admission, mixed with the additional medium emerging in vaporous form from the nozzles 3. In the present typical embodiment the case is presented where the additional medium supplied, taking the form of saturated vapor of a non-conducting medium, is at a higher temperature than the gaseous stream and part of it immediately condenses in the said stream, using for the purpose the solid and/or liquid particles of foreign matter entrained by the gas, and accordingly enlarging the said particles. The gas containing the particles of foreign matter so enlarged then flows through the ionizer 4, in which radioactive substances predominantly emitting alpha rays and spatially distributed produce a large number of ionized molecules in all parts of the cross-sectional area of flow, which ionized molecules, on colliding with the particles, enlarged by condensation, of foreign matter, electrically charge the said enlarged particles. In the then ensuing electrode system 5 the gaseous stream comes under the influence of an electrical field predominantly directed transversely to the direction of flow of the gas, which electrical field exerts on the electrically charged particles of foreign matter a deflecting force under the action of which the said particles move towards the electrodes and are precipitated there, the condensation particles forming a liquid film which contains the particles of foreign matter. The electrodes and the insulating members made of electrically non-conducting material within the electrode system are of such structure as to enable the liquid film to flow out of the electrode system, whereby the separated solid and/or liquid particles of foreign matter are at the same time conveyed away.

Where the gas has a high content of entrained particles of foreign matter it is expedient to lead the gaseous stream, after it has passed through the electrode system 5, through a second similar ionizer 4 and a second electrode system 5. This series arrangement would be more effective if the particles of foreign matter were enlarged a second time before entering the second ionizer 4. In the present case, in which an additional medium of higher temperature is admixed, a second condensation is, however, not very effective because the gaseous stream has already had its temperature correspondingly increased by the first admixture of additional medium. In order, however, to enable the particles of foreign matter to be enlarged a second time, the gas is led through a cooling device 6 and is only then admitted to the second filter tank 1, which is likewise provided with a nozzle arrangement 3 and with two separator units each comprising an ionizer 4 and an electrode system 5. The stream of gas cleansed of solid and liquid particles of foreign matter is now discharged through the spout 7.

The two filter tanks 1 and the cooling arrangement 6 are each provided with a discharge arrangement, diagrammatically represented in Figure 1 by the down-tubes 8, for conducting away the quantities of liquid additional medium separated off and contaminated with the solid and liquid particles of foreign matter. The liquid additional medium is freed in separators 9 from the particles of foreign matter entrained by or dissolved in it and is then conveyed to the device 10, in which the additional medium is converted into vaporous form at the corresponding pressure and/or necessary temperature and whence the vapour or steam passes through pipes 11 to the nozzle arrangements 3. The additional medium is recirculated in this way until its content of non-separated particles of foreign matter or dissolved gas renders its renewal necessary.

The arrangement shown diagrammatically in Figure 1 in which a cooling device 6 is inserted in the circuit before a second admixture of a vaporous additional medium to the gaseous stream can also be used within the filter tank itself. Such an apparatus is shown diagrammatically in Figure 2, wherein, in the filter tank, the gas entering at 2, and mixed with the vaporous additional medium injected through the nozzle 3, flows through the first ionizer 4 and the first electrode system 5. After the first electrode system 5 follows a cooling arrangement 6 which brings the gaseous stream to such thermal condition as enables a further admixture of the additional medium in the form of saturated vapour through the second nozzle arrangement 3 to be effective. After mixture and partial condensation of the additional medium in the gas, the latter flows through the second ionizer 4 and a second electrode system 5 to the discharge spout 7. The condensed and separated quantities of liquid additional medium can flow without hindrance out of the first and second electrode systems 5 and carry the solid and liquid particles of foreign matter away through the down-tube 8 to the separator 9 for the separation of the said particles of foreign matter. The liquid additional medium is again supplied to the steam-generator 10 and thence, in vaporous form, through the pipes 11 to the nozzles 3, thus forming a closed circuit.

It is possible, both in an apparatus with only one filter tank 1 and in an apparatus with two or more filter tanks 1, to dispense with the use of a separate cooling device 6 if the electrodes or insulating members of the first electrode system 5 in each tank are cooled intensively enough, either by means of cavities in which a coolant circulates, or in some other manner.

Figure 2:
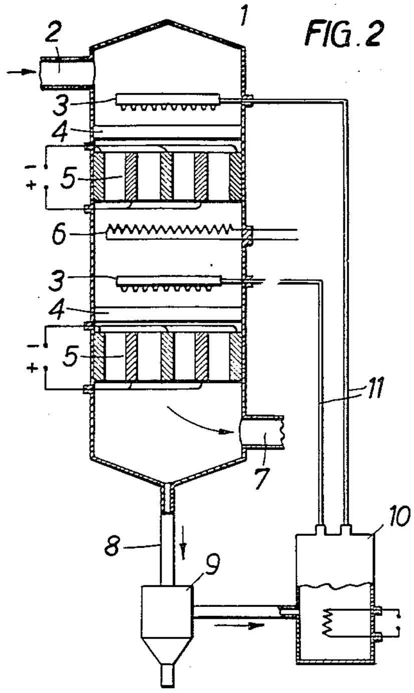
Fig. 2 shows an embodiment with an intermediate cooler and only one filter tank.

In the apparatus of Figures 1 and 2, the desired condensation of the vaporous additional medium in the gas is effected by providing a sufficiently large difference of temperature between the saturated vapour supplied and the gas. This, however, is not the only method by which rapid and intense condensation can be achieved, and any other method can be used, as for instance a method utilizing the expansion of the gas after its mixture with the vaporous additional medium.

Figure 3:
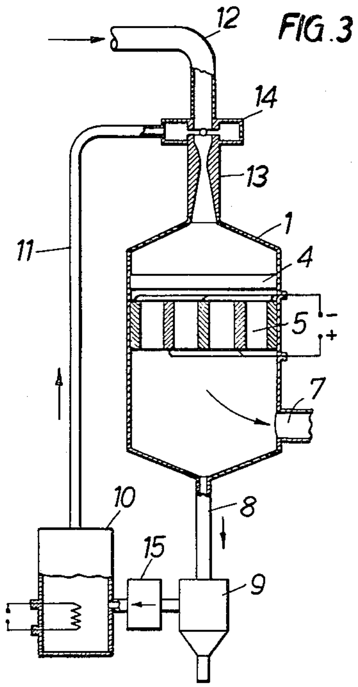
Fig. 3 shows an embodiment operating with a jet nozzle.

An embodiment of an apparatus in which expansion is effected, by way of example, through a nozzle, is shown in principle in Figure 3. Here the gas which is to be freed of entrained solid and liquid particles of foreign matter flows under pressure in the tube 12 to a jet nozzle 13, where, on the high pressure side, the additional medium in the form of saturated vapour of a non-conducting medium under suitable pressure is admixed to the gas through the openings in the annular pipe 14. The mixture then flows through the jet nozzle 13 and expands on emerging therefrom, so that intense condensation of the additional medium takes place, the solid and liquid particles of foreign matter entrained by the gas acting as condensation nuclei and being therefore enlarged. Now the gas, together with the enlarged particles of foreign matter, is conducted through the ionizer 4 and the electrode system 5 to the outlet spout 7. The separated quantities of liquid additional medium pass via the down-tube 8 to the separator 9 for the separation of the particles of foreign matter contained in the additional medium, and thence via the pump arrangement 15 to the steam generator 10. Here the saturated steam or vapour is produced which is supplied under appropriate pressure via the pipe 11 to the annular pipe 14 of the jet nozzle 13.

Apart from the method shown in and described in reference to Figures 1 and 2 for the condensation of the vaporous additional medium in the cooler gaseous stream and the method employing adiabatic expansion of the mixture through a jet nozzle in accordance with Figure 3, any other method of treating the gaseous stream during or after the introduction of the vaporous additional medium can be used which encompasses intense condensation of the additional medium introduced in an already saturated condition. For example, it is also possible, when the additional medium has been introduced into the gaseous stream, to admit the mixture batchwise into the cylinders of a reciprocator, to expand it there, and then to supply it to the filter tank with its ionizer and separator; the desired condensation can likewise be achieved by such cyclic expansion. Also, the method of mixing vaporous additional medium with the gaseous stream, with the vaporous medium and the gas at the same temperature, followed by cooling of the whole mixture jointly, can be used for condensing the additional medium from its vaporous phase.

In all cases it is also possible to produce in the ionizer 4 an additional electric field predominantly directed transversally to the direction of flow of the gas, whereby an intensification of the electrical charge of the particles of foreign matter can be achieved.

I claim:

1. A process for the electrostatic precipitation of suspended particles from a gas stream, said process comprising the steps of adding an electrically insulating medium in vapor form to a gas stream, causing condensation of said medium, whereby the suspended particles in said gas stream act as condensation nuclei, conducting the gas stream entraining said condensed medium and said particles through a radioactively irradiated space to charge electrically the particles enlarged by said condensed medium by the ionized molecules formed in the gas stream, and passing the gas stream entraining the charged particles through an electrode system forming an electrical field extending substantially transversely to the direction of the gas flow, whereby the charged particles are precipitated and form a liquid film on the electrodes of said system, the film flowing out of the electrode system and taking the particles with it, whereby the film acts as a flushing medium.

2. A process in accordance with claim 1, wherein the film flowing out of the electrode system is separated from the particles and is then vaporized and reintroduced into the process.

3. A process for the electrostatic precipitation of suspended particles from a gas stream, said process comprising the steps of adding an electrically insulating medium in saturated vapor form to a gas stream at a temperature which is substantially higher than that of said gas stream, the cooling of the added medium causing at least a partial condensation thereof, whereby the suspended particles in said gas stream act as condensation nuclei, conducting the gas stream entraining said condensed medium and said particles through a radioactively irradiated space to charge electrically the particles enlarged by said condensed medium by the ionized molecules formed in the gas stream, and passing the gas stream entraining the charged particles through an electrode system forming an electrical field extending substantially transversely to the direction of the gas flow, whereby the charged particles are precipitated and form a liquid film on the electrodes of said system, the film flowing out of the electrode system and taking the particles with it, whereby the film acts as a flushing medium.

4. A process for the electrostatic precipitation of suspended particles from a gas stream, said process comprising the steps of adding an electrically insulating medium in saturated vapor form to a gas stream at a temperature which is substantially the same as that of said gas stream, expanding the mixture to cause at least a partial condensation thereof, whereby the suspended particles in said gas stream act as condensation nuclei, conducting the gas stream entraining said condensed medium and said particles through a radioactively irradiated space to charge electrically the particles enlarged by said condensed medium by the ionized molecules formed in the gas stream, and passing the gas stream entraining the charged particles through an electrode system forming an electrical field extending substantially transversely to the direction of the gas flow, whereby the charged particles are precipitated and form a liquid film on the electrodes of said system, the film flowing out of the electrode system and taking the particles with it, whereby the film acts as a flushing medium.

References Cited in the file of this patent

UNITED STATES PATENTS

| | | |
|---|---|---|
| 1,329,737 | Wolcott | Feb. 3, 1920 |
| 1,329,818 | Wolcott | Feb. 3, 1920 |
| 1,381,719 | McGee | June 14, 1921 |
| 1,413,877 | Schmidt | Apr. 25, 1922 |
| 2,381,455 | Jacob | Aug. 7, 1945 |
| 2,593,869 | Fruth | Apr. 22, 1952 |

FOREIGN PATENTS

| | | |
|---|---|---|
| 144,701 | Great Britain | June 10, 1920 |
| 677,504 | France | Mar. 11, 1930 |